(12) United States Patent
Krefting

(10) Patent No.: US 10,703,149 B2
(45) Date of Patent: Jul. 7, 2020

(54) AIR VALVE FOR TUBELESS PNEUMATIC TIRE

(71) Applicant: CushCore, Inc., Bend, OR (US)

(72) Inventor: Adam Krefting, Bend, OR (US)

(73) Assignee: CushCore Inc., Bend, OR (US)

( * ) Notice: Subject to any disclaimer, the term of this patent is extended or adjusted under 35 U.S.C. 154(b) by 285 days.

(21) Appl. No.: 15/978,269

(22) Filed: May 14, 2018

(65) Prior Publication Data

US 2018/0370305 A1 Dec. 27, 2018

Related U.S. Application Data

(60) Provisional application No. 62/525,681, filed on Jun. 27, 2017.

(51) Int. Cl.
| | | |
|---|---|---|
| *B60C 29/00* | (2006.01) | |
| *F16K 15/20* | (2006.01) | |
| *B60C 29/02* | (2006.01) | |
| *B60B 25/22* | (2006.01) | |

(52) U.S. Cl.
CPC .......... *B60C 29/002* (2013.01); *B60C 29/005* (2013.01); *B60C 29/02* (2013.01); *F16K 15/20* (2013.01); *B60B 25/22* (2013.01)

(58) Field of Classification Search
CPC ..... B60C 29/00; B60C 29/002; B60C 29/005; B60C 29/007; B60C 29/02; F16K 15/20
See application file for complete search history.

(56) References Cited

U.S. PATENT DOCUMENTS

| | | | |
|---|---|---|---|
| 10,286,736 B2* | 5/2019 | Krefting | B60C 17/01 |
| 10,293,640 B2* | 5/2019 | Krefting | B60O 7/10 |
| 2002/0134428 A1* | 9/2002 | Gabelmann | B60C 29/007 137/224 |
| 2012/0218095 A1* | 8/2012 | Zhou | B60C 23/003 340/447 |
| 2016/0178075 A1* | 6/2016 | Chen | B60C 29/005 137/227 |
| 2017/0057309 A1* | 3/2017 | Kobler | B60C 29/002 |
| 2018/0333997 A1* | 11/2018 | Vargus | B60C 29/02 |
| 2018/0370303 A1* | 12/2018 | Krefting | B60C 25/14 |
| 2018/0370305 A1* | 12/2018 | Krefting | B60C 29/002 |
| 2019/0001763 A1* | 1/2019 | Jordan | B60C 29/002 |
| 2019/0263201 A1* | 8/2019 | Chang | B60C 29/02 |
| 2019/0390785 A1* | 12/2019 | Moore | B60C 29/005 |
| 2020/0070600 A1* | 3/2020 | Robert | B60C 29/02 |
| 2020/0086700 A1* | 3/2020 | Kobler | F16K 15/147 |

* cited by examiner

*Primary Examiner* — Jason C Smith
(74) *Attorney, Agent, or Firm* — Hancock Hughey LLP

(57) ABSTRACT

Air valve for a pneumatic tire has a threaded shaft between a first end defining an air inlet and an opposite, second end that is located within the bounded space of a tire mounted on a rim. The air passageway through the air valve has at least one outlet at the distal end of the valve that exists the device through a side portion rather than the terminal end of the device. In a preferred embodiment the air passageway is T-shaped so that air flowing into the tire flows in a non-linear path, exiting the air outlets transverse to the air flow through the inlet into the air passageway.

20 Claims, 4 Drawing Sheets

AIR VALVE FOR TUBELESS PNEUMATIC TIRE

TECHNICAL FIELD

The present invention relates generally to air valves for pneumatic tires used in vehicles of all types, particularly bicycles, motorcycles and automobiles, and more specifically to an air valve designed for use especially with tubeless bicycle tires. The inventive air valve is adapted for inflating and deflating the tire with which it is used through a novel and unique air passageway through the valve.

BACKGROUND OF THE INVENTION

Air valves—also commonly called "valve stems," for tubeless tires are ubiquitous and are used for all kinds of tires for all kinds of vehicles from bicycles to motorized vehicles. Described generally, an air valve for a tubeless tire is a device that allows the tire to be inflated and deflated on the wheel; because the tire is tubeless, the valve provides an airtight fit where the valve is retained in the wheel or rim. The airtight seal between the air valve and the rim where the valve extends through the rim is very important to maintain proper air pressure in the tire without air leaks. There are a variety of known air valve designs for providing a seal at the interface between the rim and the valve, but in most cases there is some type of rubber housing or body on the air valve that is compressed against the opening or bore in the rim through which the air valve extends.

All air valves have in inlet opening, an air passageway through the valve, and an air outlet that is in the space bounded by the tire and rim where the pressurized air of the inflated tire is retained—"inlet" and "outlet" as used herein are relative terms and in this specification refers to the condition when air is being filled into the tire. The "inlet" is thus where air enters the air valve and the "outlet" is where air exits the valve. Of course, when a tire is being deflated the air flow through the air valve reverses—the "outlet" thus becomes the "inlet" and the "inlet" the "outlet." Nonetheless, for purposes herein these relative terms are used to describe the airflow direction as a tire is inflated.

Once an air valve has been installed in a rim and a tire has been mounted to the rim, the tire is inflated by attaching a pressurized air source to the external portion of the air valve and passing pressurized air from the air source through the inlet opening, through the air passageway and into the tire through the air outlet. Most air valves have an internal air shut-off valve that is opened when the source of pressurized air is attached to the external end of the valve—i.e., the inlet. Once the tire has been inflated to the desired pressure the air source is detached from the air valve, and the internal shut-off valve is closed to prevent air from escaping and the tire is ready for use; typically, the higher pressure within the bounded space relative to the pressure outside of the tire pushes the internal shut-off valve into the closed position. Often, a secondary mechanism is engaged to prevent the internal shut-off valve from opening during use.

The air passageway through known air valves is a linear bore that runs through the valve shaft from inlet to outlet; this arrangement is well known and works very well.

Recently, certain improvements have been developed for tubeless tires that result in far better performance, but which complicate the process of inflating and deflating the tire. One specific example is the tire insert that is described in (a) U.S. patent application Ser. No. 14/656,250, now U.S. Pat. No. 10,293,640, (b) International Patent Application No. PCT/US2015/020213 (published at WO 2016/048409 A1), and (c) U.S. patent application Ser. No. 15/348,662, now U.S. Pat. No. 10,286,736, all of which are assigned to the assignee of and applicant for the present application and the entire contents of which are incorporated herein by reference. As described and shown in the referenced patent applications an annular member is disposed between the rim and the tire and provides significant functional and performance improvements. Notably, review of the drawings of the patent applications referenced above in this paragraph shows that the internal end of the valve stem—that is, the outlet of the valve stem through which air flows into the tire as the tire is being inflated, abuts or is in close proximity to the annular member that encircles the rim and is in the interior of the tire. This contact or close proximity typically is not a problem with the tire is being inflated since pressurized air flowing through the air valve tends to push the flexible annular member away from the air valve. However, since the annular member is flexible, it may tend to collapse or move toward the air valve as the air pressure in the tire decreases (such as when the tire is being deflated) and thus occlude or otherwise block the air passageway through the valve stem of a conventional air valve with a linear air passageway. More specifically, with an annular insert such as that shown in the referenced patent applications it may be fairly simple to inflate the tire, but deflating the tire can be made difficult given the obstruction of the air passageway at the inner end of the valve stem, which could be blocked by the annular member.

The present invention defines a novel and unique air valve that has a specially configured air passageway that allows a tire to be inflated and deflated even when the internal end of the valve stem is occluded and blocked, for example, when the internal end of the valve stem is in contact with an internal structure in the tire, such as the annular member described in the three patent applications that are incorporated herein.

SUMMARY OF THE INVENTION

The present invention is defined by an air valve for use with tubeless pneumatic tires of all kinds. The inventive air valve incorporates an air passageway that has one or more air outlets at the distal end of the air valve shaft but on the sides of the air valve rather than at the terminal end of the air valve, thereby allowing the air valve to be used with a tire that incorporates an internal structure that otherwise could occlude the air outlet in a conventional air valve.

BRIEF DESCRIPTION OF THE DRAWINGS

Further features and advantages of the present invention will become apparent from the following detailed description, taken in combination with the appended drawing, in which.

A conventional air valve of the type commonly known as a "Presta" valve is shown in FIGS. 1 and 2. Specifically.

DETAILED DESCRIPTION OF PREFERRED AND ILLUSTRATED EMBODIMENTS

Figures 1, 2:
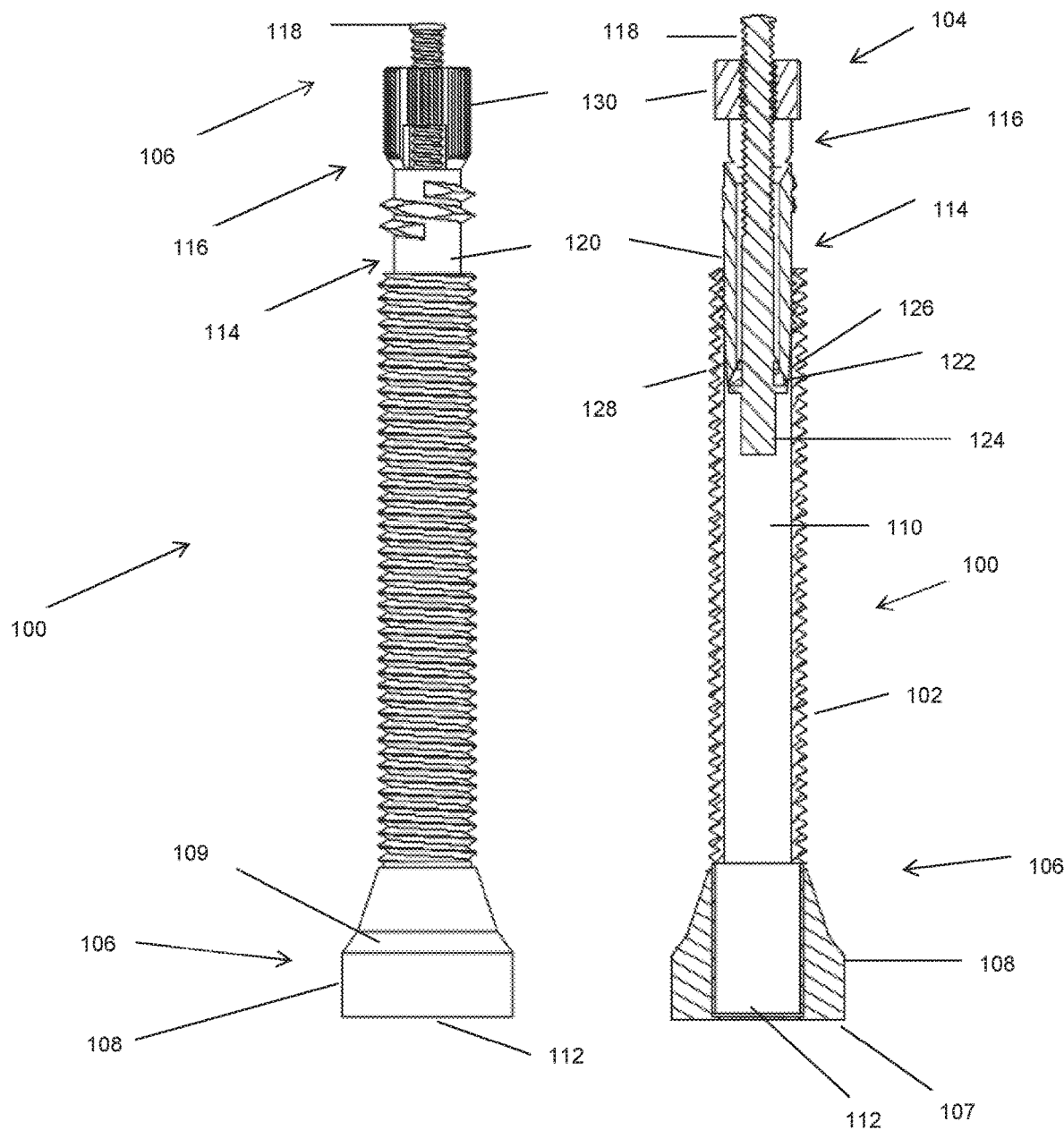
FIG. 1 is a side elevation view of a prior art Presta valve.
FIG. 2 is a side cross sectional view of the prior art Presta valve shown in FIG. 1.

As described in detail below, the apparatus according to the invention is an air valve for use with tubeless tires. With reference to the prior art air valves 100 shown in FIGS. 1 and 2 the air valve 100 on the illustrated valve is a conventional Presta air valve that is of the type used with a tubeless tire. Valve 100 has a threaded shaft with a proximate end 104 and a distal end 106 that defines a base 107 that has a larger diameter than the threaded shaft 102 and which has a rubber seat 108 that is somewhat frusto-conically shaped immediately adjacent the base 107 and toward proximate end 104. When air valve 100 is installed in a rim, the threaded shaft extends through a bore in the rim, proximate end 104 is external to the rim (that is, proximate end 104 is accessible by the user to add air to the tire) and distal end 106 is located interiorly of the rim. Rubber seat 108 is oversized relative to the bore through the rim and includes a circumferential shoulder 109 that is compressed against the rim by a retaining nut (described below in respect of the inventive air valve 10) that is threaded onto threaded shaft 102 to define an airtight seal; an O-ring may be used to enhance the seal between the rim and the air valve 100.

With reference specifically to the cross sectional view of FIG. 2, an air passageway 110 is formed through the threaded shaft 102 and defines an air outlet 112 at the base 107 of distal end 106 and an air inlet 114 at the proximate end, which as shown in the photograph utilizes a conventional shut-off valve 116 that is used to open and close the air inlet 114. Air outlet 112 exits shaft 102 directly through the base 107 at the distal end 106—the air passageway 110 is a linear opening extending down the length of the entire air valve 100.

As noted, the valve 100 of FIGS. 1 and 2 is of the type for installation in a tubeless tire. Conventional Presta valves are also often used in tire tubes. In that case, the valve is structurally nearly identical to that shown in FIGS. 1 and 2 except the frusto-conically shaped rubber seat is replaced with a base that is bonded directly to the tire tube with an air-tight seal.

The operational characteristics of the air valve 100 are detailed briefly for background and context. The shut-off valve 116 of air valve 100 shown in FIGS. 1 and 2 is in the closed position. In this the position of the shut-off valve air, high pressure air within a tire is unable to escape the tire and air cannot be filled through the valve into the tire. The shut-off valve 116 comprises a threaded shaft 118 that extends axially through a cylindrical housing 120 that extends partially into passageway 110—the housing 120 is secured in the passageway by, for example, press fitting. A valve 122 is formed near the interior, distal end 124 of threaded shaft 118 and in the closed position of FIG. 2, the valve 122 seats and seals against a valve seat 126 at the interior end 128 of the cylindrical housing 120. In the closed position a cap 130 with an internally threaded bore is threaded onto the external portion of threaded shaft 118 is tightened against the outer end of housing 120 and this draws the valve 122 tightly into the valve seat 126 to create an air-tight seal. It should be noted that when there is sufficiently high pressure within the tire the valve 122 typically is pushed against the valve seat 126 to create an air-tight seal even if the cap 130 is not tightened as shown in FIG. 2.

The shut-off valve 116 is opened by unscrewing a cap 130 and then pushing the shaft 118 inwardly toward the interior of the tire (downwardly in the view of FIG. 2). This unseats valve 122 from seat 126 and allows air be pumped into the tire, and air to be vented from the tire, through air passageway 110.

With that information as background, an air valve 10 according to the present invention is shown on the top in FIG. 1. Except in respect of the air passageway through the valve and as described herein, air valve 10 is identical to air valve 100. Thus, air valve 10 has a threaded shaft 12, a proximate end 14 and a distal end 16 that is defined by an oversized base 18 with a frusto-conical rubber seat 20 immediately adjacent base 18 and defined by a circumferencial shoulder 21 and toward proximate end 16. Although not shown in the drawings, optionally and in some circumstances an O-ring may be slipped onto threaded shaft 12 with a retaining nut threaded onto the shaft. In use, the proximate end 14 of threaded shaft 12 is inserted through the bore in the rim (from the interior of the rim toward the exterior) with the O-ring and retaining nut removed (if they are being used) and such that proximate end 14 is external to the rim. The O-ring is then slipped onto threaded shaft and the retaining nut may be threaded onto the shaft and tightened. This compresses shoulder 21 of rubber seat 20 against the internal portion of the rim and the O-ring against the rim externally to create an airtight seal.

Figure 6:
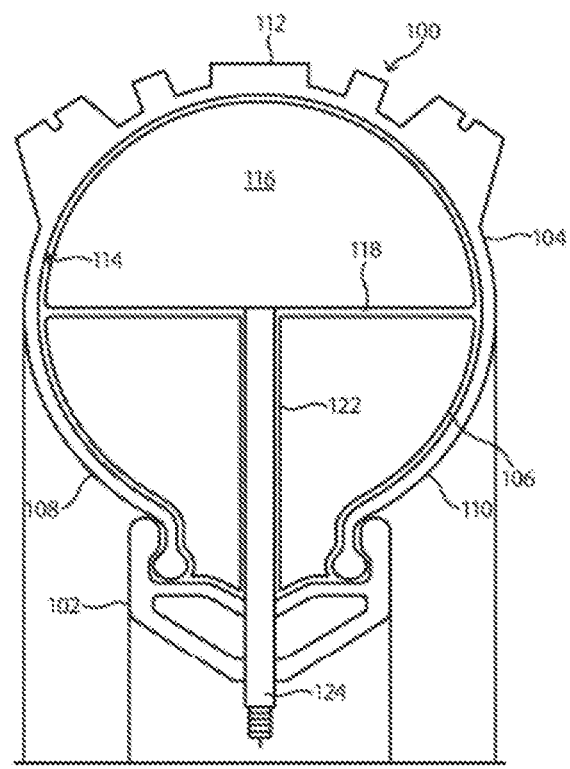
FIG. 6 includes a cross-sectional view of a tire assembly in accordance with an embodiment.
Figure 7:
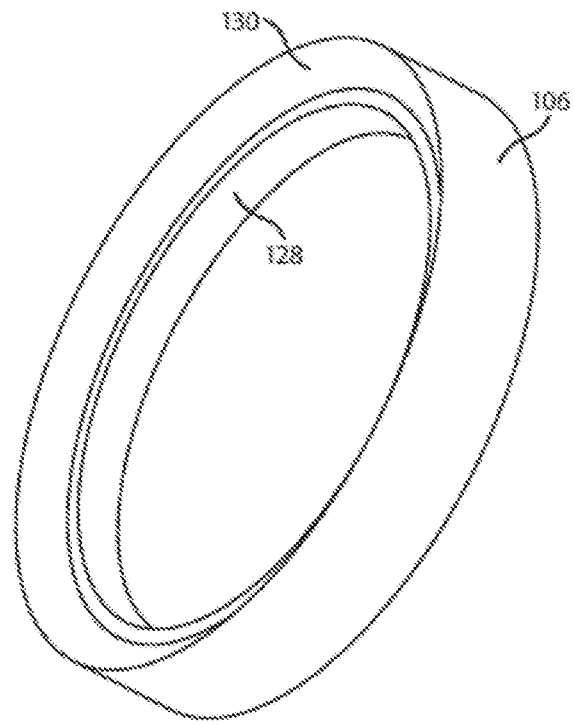
FIG. 7 includes a perspective view of an annular member in accordance with an embodiment.

A tire assembly in accordance with one or more of the embodiments described herein can generally provide the advantages of a low pressure tire while avoiding the accompanying disadvantageous thereof. Referring now to FIG. 6, a tire assembly 100 in accordance with one or more of the embodiments described herein can generally include a pneumatic tire 104 and an annular member 106 disposed at least partially therein. The pneumatic tire 104 includes two opposing sidewalls 108 and 110 connected by a tread 112. In operation, an innermost portion of the sidewalls 108 and 110 can rest against a rim 102. The annular member 106 can rest against at least a portion of an interior surface 114 of the pneumatic tire 104 and can provide an outward force thereagainst. After reading this specification, skilled artisans will understand that the tire 104 may have any similar shape to that described above, and that the example is presented to improve understanding and not to limit the scope of the disclosure. In a particular embodiment, such as illustrated in FIGS. 6 and 7, the annular member 106 has a base portion 128 disposed adjacent to the rim 102 and an ellipsoidal portion 130 extending outward therefrom. The base portion 128 adjacent to the rim 102 may be contoured to accurately fit within the rim. The ellipsoidal portion may be contoured to accurately fit within the tire 104. This may allow the annular member 106 to accurately fit with both the non-ellipsoidal profile of the rim 102 and the ellipsoidal profile of the interior surface 114 of the tire 104.

Air valve 10 includes a conventional shut-off valve 22 that is identical both structurally and functionally to the air valve 116 described above with respect to the Presta valve 100 shown in FIGS. 1 and 2. The description of the operation and structure of the shut-off valve with respect to FIGS. 1 and 2 applies equally to FIGS. 3 and 4.

Air valve 10 has an air passageway 30 through the valve 10 but the air outlet 32, which is at distal end 16 and thus interior of the tire and rim when the air valve is installed in a rim, does not extend through the terminal end 34 of the base 18. Instead, the air outlet 32 exits base 18 through the side 35 of the base, distally of rubber seat 20. In the embodiment of air valve 10 shown in FIGS. 3 and 4 the air passageway 30 has 2 air outlets 32, each 180 degrees opposite of the other, so that the air passageway 30 is T-shaped as detailed below. As seen in the cross sectional view of FIG. 4, the portion of air passageway 30 that is transverse to the portion through threaded shaft 12—that is, that portion of the air passageway in base 18, extends completely through the base 18. It will be appreciated that since the air outlets 32 do not exit the valve through the terminal end 34 of base 18 and instead exit through the side 35 of base 18 it is possible for air to flow through the air passageway 30 in both directions even if an internal structure such as the annular member described in the patent applications referenced above is pressing against terminal end 34.

Figures 3, 4:
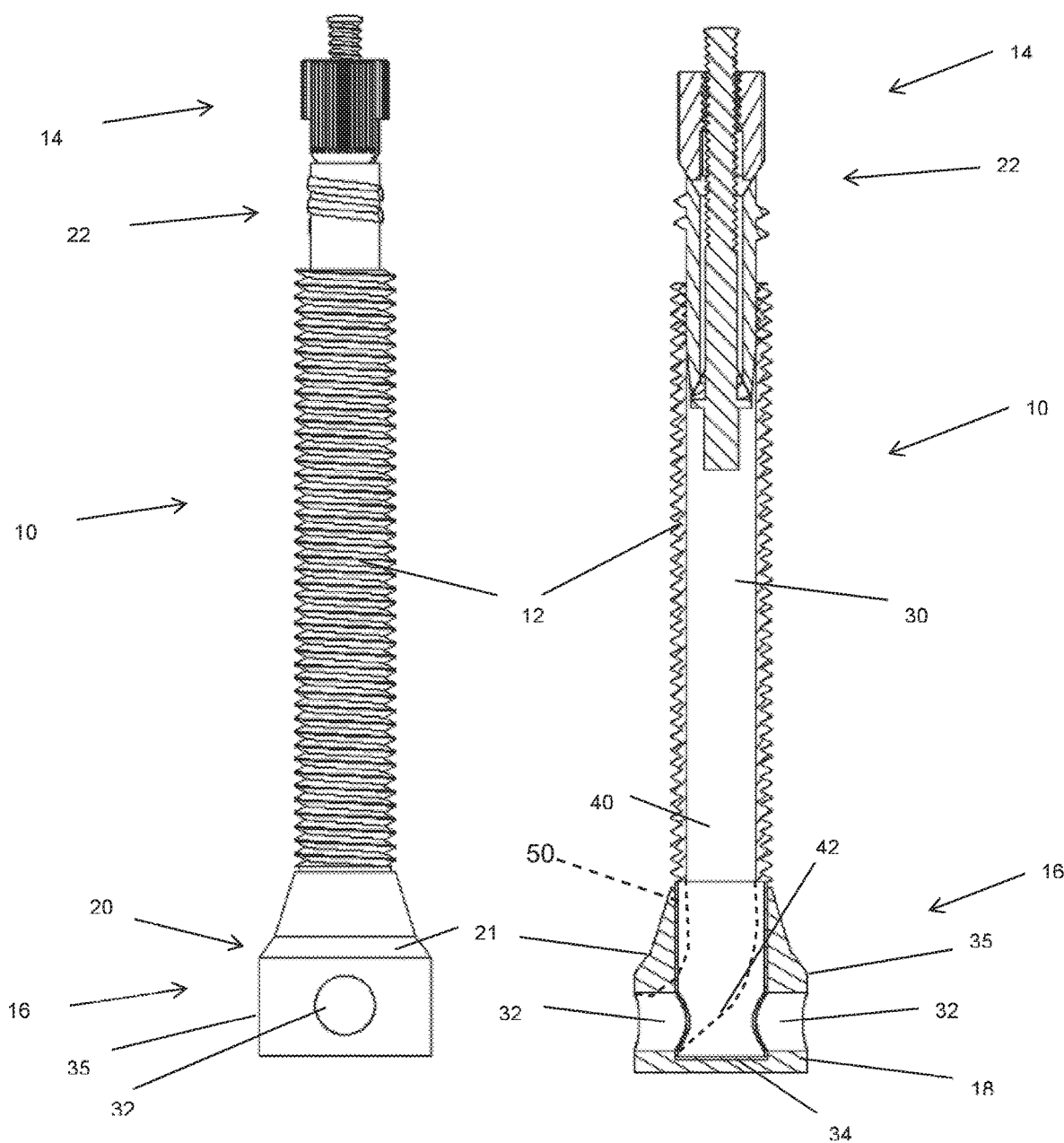
FIG. 3 is a side elevation view of an air valve according to the present invention.
FIG. 4 is a cross sectional view of the air valve shown in FIG. 3, taken along the major longitudinal axis of the valve body and in which the valve body has been rotated 90 degrees from the view of FIG. 3.
Figure 5:
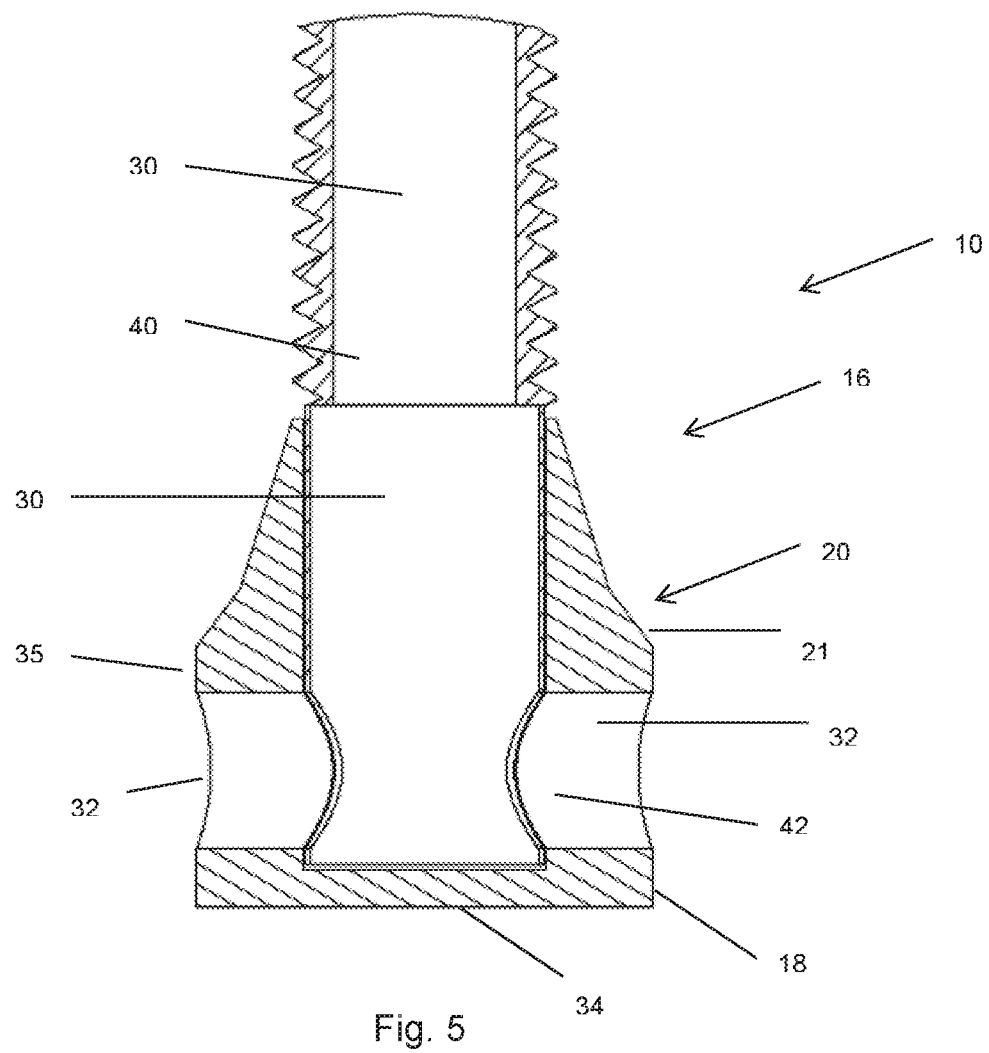
FIG. 5 is a close up and cross sectional view of the interior/distal end of the air valve according to the present invention as shown in FIG. 4.

FIG. 5 is a close up view of the distal end 16 of air valve 10 and it may be seen that air passageway 30 exits at outlets 32 that are formed through the side 35 of base 18. Air passageway 30 is in FIGS. 3, 4 and 5 is defined by a first, linear section 40 that extends most of the length of shaft 12, but which terminates at its intersection with a transverse bore section 42 in base 18 to thereby define a T-shaped air passageway 30 that has two opposed air outlets 32 that extend through the side 35 of base 18. Linear section 40 is in fluid communication with transverse portion 42. Thus, the air passageway 30 is defined by a first portion through shaft 12 and a second portion through base 18 that is transverse to the first portion.

An essential structural characteristic of the present invention is an air valve for use with tubeless tires that has an air inlet externally of the rim and an air outlet that exits the air valve at a distal end of the air valve in a position other than at the terminal end of the air valve. The embodiment shown in the drawings incorporates a T-shaped air passageway with two air outlets located between the terminal end of the valve and the rim. It will be appreciated that one air outlet would be sufficient, or more than 2. Accordingly, the air passageway through the inventive valve is non-linear from the inlet through the outlet(s). Moreover, the air passageway through the valve could be curved and thus also non-linear so long as the one or more air outlets exit the base of the valve at a position (or positions) other than through the terminal end of the base—the air passageway may therefore be non-linearly aligned between the inlet and the outlet. This is illustrated in FIG. 4 with curvilinear passageway 50 shown in phantom lines. Further, so long as one or more air outlets is located through the side of the base, the air passageway may also extend through the terminal end of the base as with conventional air valves such as valve 100 of FIG. 1.

While the present invention has been described and shown as it is embodied in a Presta type valve, those of skill in the art will recognize that the invention applies equally to a Schrader type of valve.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. An air valve for a tubeless pneumatic tire assembly including a rim, a tire mounted on the rim and an annular insert mounted on the rim such that the annular member is disposed between the rim and the tire, the air valve, comprising:
a shaft having a proximate end and a distal end having a base with an enlarged size relative to the size of the shaft at the proximate end, the base portion defining a base sidewall portion and a base terminal end portion adapted to be in contact with the annular insert; and
an air passageway extending from an air inlet at the proximate end to an air outlet extending through the sidewall portion of the base to define an air passageway through the shaft that is not occluded by the annular insert.

2. The air valve according to claim 1 including at least two air outlets, each of which extends through the sidewall portion of the base.

3. The air valve according to claim 2 in which the air passageway is defined by a first linear portion in the shaft and a transverse portion in the base, the first linear portion communicating with the transverse portion.

4. The air valve according to claim 1 in which the air valve is of the Presta type.

5. The air valve according to claim 1 in which the air valve is of the Schrader type.

6. The air valve according to claim 1 including a shut-off valve at the proximate end.

7. An air valve for a tubeless pneumatic tire assembly including a rim, a tire mounted on the rim and an annular insert mounted on the rim such that the annular member is disposed between the rim and the tire, the air valve, comprising:
a shaft having an air passageway therethrough, the air passageway and extending from an air inlet to at least one air outlet adjacent to the annular insert and wherein the air passageway is non-linear from the air inlet to the air outlet and the outlet is not occluded by the annular insert.

8. The air valve according to claim 7 including a base at a distal end of the shaft and in which the air passageway further comprises a first portion extending through the shaft and a second portion extending through the base.

9. The air valve according to claim 8 wherein the second portion is defined by a bore extending through the base portion to thereby define a pair of air outlets.

10. The air valve according to claim 7 including a base at a distal end of the shaft and in which the air passageway further comprises a curvilinear pathway.

11. The air valve according to claim 7 a shut-off valve in the air passageway.

12. The air valve according to claim 11 in which the base is a frusto-coninical member that has a circumferential shoulder.

13. An air valve for a tubeless pneumatic tire assembly including a rim, a tire mounted on the rim and an annular insert mounted on the rim such that the annular member is disposed between the rim and the tire, the air valve, comprising:
a shaft having a first end and a second end;
a base on the second end, the base having a base sidewall portion and a base terminal end portion positioned between the rim and the annular insert;
an air passageway extending from an inlet at the first end to an outlet through the sidewall portion of the base; and
a shut-off valve in the air passageway.

14. The air valve according to claim 13 in which the air passageway is defined by a first axial portion in the shaft and a second axial portion in the base, wherein the second axial portion is transverse to the first axial portion.

15. The air valve according to claim 14 in which the second axial portion extends through the base to define two outlets.

16. The air valve according to claim 13 in which the air passageway define a curved pathway.

17. The air valve according to claim 16 in which the air passageway includes a single outlet through the base.

18. The air valve according to claim 13 wherein the base defines a circumferential shoulder.

19. The air valve according to claim 13 in which the air valve is of the Presta type.

20. The air valve according to claim 13 in which the air valve is of the Schrader type.

\* \* \* \* \*